United States Patent
Lee et al.

(10) Patent No.: US 11,145,902 B2
(45) Date of Patent: Oct. 12, 2021

(54) ELECTROLYTE FOR LITHIUM SECONDARY BATTERY, LITHIUM SECONDARY BATTERY CONTAINING THE SAME

(71) Applicants: Hyundai Motor Company, Seoul (KR); Kia Motors Corporation, Seoul (KR); UNIST (Ulsan National Institute of Science and Technology), Ulsan (KR)

(72) Inventors: Yoon Sung Lee, Gyeonggi-do (KR); Jung Young Cho, Seoul (KR); Ikkyu Kim, Gyeonggi-do (KR); Seung-Min Oh, Incheon (KR); DongHui Kim, Gyeonggi-do (KR); Nam-Soon Choi, Ulsan (KR); Koeun Kim, Ulsan (KR); Juyeon Lee, Ulsan (KR); Sung Ji Park, Ulsan (KR)

(73) Assignees: Hyundai Motor Company, Seoul (KR); Kia Motors Corporation, Seoul (KR); UNIST (Ulsan National Institute of Science and Technology), Ulsan (KR)

(*) Notice: Subject to any disclaimer, the term of this patent is extended or adjusted under 35 U.S.C. 154(b) by 149 days.

(21) Appl. No.: 16/416,863

(22) Filed: May 20, 2019

(65) Prior Publication Data
US 2020/0235431 A1 Jul. 23, 2020

(30) Foreign Application Priority Data
Jan. 23, 2019 (KR) .................. 10-2019-0008614

(51) Int. Cl.
*H01M 10/0567* (2010.01)
*H01M 10/0569* (2010.01)
(Continued)

(52) U.S. Cl.
CPC ... *H01M 10/0567* (2013.01); *H01M 10/0525* (2013.01); *H01M 10/0568* (2013.01);
(Continued)

(58) Field of Classification Search
None
See application file for complete search history.

(56) References Cited

U.S. PATENT DOCUMENTS

| | | | |
|---|---|---|---|
| 2010/0248041 A1* | 9/2010 | Kikuchi | H01M 10/054 429/342 |
| 2010/0280013 A1* | 11/2010 | Koura | C07D 401/04 514/218 |
| 2012/0107728 A1 | 5/2012 | Ryu et al. | |

FOREIGN PATENT DOCUMENTS

| | | |
|---|---|---|
| EP | 1 195 785 A1 | 4/2002 |
| EP | 3 051 619 A1 | 8/2016 |
| KR | 10-2015-0024478 A | 3/2015 |

OTHER PUBLICATIONS

PubChem. NIH National Library of Medicine. "Compound Summary 3-Trimethyll-2-oxazolidinone". pp. 1-18. Mar. 26, 2005. (Year: 2005).*

(Continued)

*Primary Examiner* — Christopher P Domone
(74) *Attorney, Agent, or Firm* — Mintz Levin Cohn Ferris Glovsky and Popeo, P.C.; Peter F. Corless (57) ABSTRACT

Disclosed are an electrolyte for a lithium secondary battery and a lithium secondary battery including the same. The electrolyte for the lithium secondary battery includes a lithium salt, a solvent component and an additive including one or more of the following compounds, (Continued)

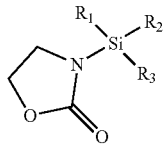
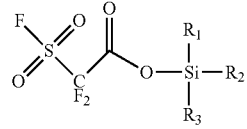
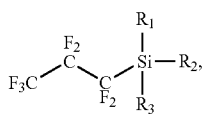

wherein each of $R_1$, $R_2$ and $R_3$ is independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms.

9 Claims, 6 Drawing Sheets

(51) Int. Cl.
*H01M 10/0568* (2010.01)
*H01M 10/0525* (2010.01)

(52) U.S. Cl.
CPC .... *H01M 10/0569* (2013.01); *H01M 2220/20* (2013.01); *H01M 2300/004* (2013.01); *H01M 2300/0042* (2013.01)

(56) References Cited

OTHER PUBLICATIONS

Partial European Search Report dated Nov. 8, 2019 in corresponding EP Application No. 19174332.7.

* cited by examiner

FIG. 1A

-- PRIOR ART --

Chemical shift (ppm)

ELECTROLYTE FOR LITHIUM SECONDARY BATTERY, LITHIUM SECONDARY BATTERY CONTAINING THE SAME

CROSS-REFERENCE TO RELATED APPLICATION(S)

This application claims the benefit of priority to Korean Patent Application No. 10-2019-0008614, filed on Jan. 23, 2019 in the Korean Intellectual Property Office, the entire disclosure of which is incorporated herein by reference.

TECHNICAL FIELD

The present invention relates to an electrolyte for a lithium secondary battery, and a lithium secondary battery comprising the same.

BACKGROUND

Technology development and demand for mobile devices have increased, the demand for secondary batteries as energy sources has increased rapidly, and lithium secondary batteries having high energy density and voltage have been widely used among secondary batteries. Generally, a lithium secondary battery includes a negative electrode, a positive electrode, a separator disposed between the electrodes, and an electrolyte, and the electrolyte in which an appropriate amount of a lithium salt is dissolved in an organic solvent is used.

In the related art, for example, in the currently used secondary battery electrolytes, various side reactions occur due to repeated charging and discharging, and by-products generated by such side reactions are factors that deteriorate the performance of the battery. In particular, when $LiPF_6$ lithium salt is contained in the electrolyte, HF produced by the following series of Reaction formula (1) damages the Solid Electrolyte Interface (SEI) on the surface of the negative electrode and the Cathode Electrolyte Interface (CEI) on the surface of the positive electrode, and it may lead to degradation of the electrodes, which may seriously impair the battery operation.

<Reaction formula (1)>

For instance, HF may deteriorate CEI of positive electrode and SEI of negative electrode and may further cause elution of positive electrode transition metal.

SUMMARY

In preferred aspects, provided is an electrolyte for a lithium secondary battery improved in stability by removing by-products which destroy the SEI film of an electrode, and a lithium secondary battery comprising the same.

In one aspect, provided is an electrolyte solution for a lithium secondary battery that may include a lithium salt, a solvent component, and an additive. The additive may include one or more of the following compounds.

In the above compound, $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms.

Also, the electrolyte may include the additive in an amount of about 0.2 to 3.0 wt % based on the total weight of the electrolyte.

Preferably, the solvent component may suitably include one or more selected from the group consisting of a carbonate-based, ester-based, ether-based, ketone-based, aprotic solvent and combinations thereof.

Preferably, the lithium salt may suitably include one or more selected from the group consisting of $LiPF_6$, $LiBF_4$, $LiClO_4$, $LiSbF_6$, $LiAsF_6$, $LiN(SO_2C_2F_5)_2$, $LiN(SO_3C_2F_5)_2$, $LiN(SO_2F_2)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (where x and y are natural numbers), and $LiCl$, $LiI$, $LiB(C_2O_4)_2$.

Preferably, the electrolyte may further include an amount of about 0.5 to 3.0 wt % of at least one of vinylene carbonate (VC) and fluoroethylene carbonate (FEC) based on the total weight of the electrolyte.

In another aspect, provided is a lithium secondary battery that may include an electrode including a positive electrode and a negative electrode, a separator between the electrodes, and an electrolyte including a lithium salt, a solvent, and an additive. Particularly, the additive may include one or more selected from the group consisting of the following compounds.

In the above compound, $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms.

Preferably, the electrolyte may suitably include the additive in an amount of about 0.2 to 3.0 wt %, based on the total weight of the electrolyte.

Preferably, the solvent component may suitably include one or more selected from the group consisting of carbonate-based, ester-based, ether-based, ketone-based, aprotic solvent and combinations thereof.

Preferably, the lithium salt may suitably include one or more selected from the group consisting of $LiPF_6$, $LiBF_4$, $LiClO_4$, $LiSbF_6$, $LiAsF_6$, $LiN(SO_2C_2F_5)_2$, $LiN(SO_3C_2F_5)_2$, $LiN(SO_2F_2)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (where x and y are natural numbers), $LiCl$, $LiI$, $LiB(C_2O_4)_2$ and combinations thereof.

Preferably, the electrolyte further may include an amount of about 0.5 to 3.0 wt % of at least one of vinylene carbonate (VC) and fluoroethylene carbonate (FEC), based on the total weight of the electrolyte.

Further provided is a vehicle including the lithium battery as described herein.

The electrolyte for a lithium secondary battery may improve the life characteristics of the battery by comprising the additive, which can scavenge an acidic substance such as HF or the like produced as a result of decomposition of the electrolyte. The additive may prevent an acidic substance from dissolving each electrode film or damaging the active material of the positive electrode. In addition, the electrolyte may maintain a low resistance value even though an additive is added. Also, according to an embodiment of the present invention, when a carbonate-based solvent is used, the additive component compound may have higher oxidation and reduction decomposition tendency than the solvent so that the CEI of a positive electrode and the SEI of a negative electrode may be formed, and because of this the electrode interface and the electrolyte bulk may be stabilized.

DETAILED DESCRIPTION OF ILLUSTRATIVE EMBODIMENTS

Hereinafter, preferred embodiments of the present invention will be described. However, the embodiments of the present invention may be modified into various other forms, and the technical idea of the present invention is not limited to the embodiments described below. Further, the embodiments of the present invention are provided to more fully explain the present invention to those skilled in the art.

The terms used in the present application are used only to illustrate specific examples. Thus, for example, the expression of the singular includes plural expressions unless the context clearly dictates otherwise. In addition, the terms "include" or "have," and the like used in the present application are used to specifically denote the presence of stated features, steps, functions, elements, or combinations thereof and the like, and are not used to preparatorily preclude the presence of elements, steps, functions, components, or combinations thereof.

Unless defined otherwise, all terms used herein should be interpreted to have the same meaning as commonly understood by one of ordinary skill in the art to which this invention belongs. Thus, unless explicitly defined herein, certain terms should not be construed in an overly ideal or formal sense.

It should also be understood that the terms "about," "substantially," and the like in the present specification are used in the numerical value or in the vicinity of the numerical value in the meanings mentioned when inherent manufacturing and material allowable errors are presented, and are used to prevent conscienceless intruders from unreasonably using the accurate or absolute numbers, disclosed in the present invention to help understanding of the present invention. For example, "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In one aspect, provided is an additive component, or "additive", which may include one or more of the following compounds.

In the above compound, $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms.

Also, in the present specification, $R_1$, $R_2$ and $R_3$ in "Chemical formulas (1) to (3)" and "Reaction formulas (2) to (4)" are represented by methyl groups for convenience, and each may be independently interpreted as an alkyl group having 1 to 20 carbon atoms, a cycloalkyl group having 3 to 20 carbon atoms, an aryl group having 6 to 30 carbon atoms, or an arylalkyl group having 6 to 30 carbon atoms. In certain embodiments, the additive may be one or more of the above compounds.

In order to solve the above-described problems in the related art, for example, producing HF, the present invention provides an electrolyte for a lithium secondary battery, which can remove by-products that break the SEI of an electrode, thereby improving stability, and a lithium secondary battery comprising the same.

In an aspect, an electrolyte for a lithium secondary battery may include a lithium salt, a solvent component, and an additive including one or more of the following compounds.

In the above compound, $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms.

Hereinafter, the constituent elements of the electrolyte of the present invention will be described respectively.

Lithium Salt

The lithium salt may include a conventional lithium salt, and is not particularly limited. Preferably, the lithium salt may include one or more selected from the group consisting of $LiPF_6$, $LiBF_4$, $LiClO_4$, $LiSbF_6$, $LiAsF_6$, $LiN(SO_2C_2F_5)_2$, $LiN(SO_3C_2F_5)_2$, $LiN(SO_2F_2)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (where x and y are natural numbers), $LiCl$, $LiI$, $LiB(C_2O_4)_2$ and combinations thereof.

When a compound having a fluorine atom is used as an inorganic lithium salt, free ions promote SEI formation, and a passive film may be formed on the surface of the electrodes, whereby an increase in internal resistance can be suppressed. Preferably, a phosphorus atom-containing compound as an inorganic lithium salt may be used because it facilitates the release of free fluorine atoms. In certain exemplary embodiments, the lithium salt may include $LiPF_6$.

However, when the electrolyte contains $LiPF_6$ lithium salt, the HF produced by the following series of reaction formula (1) may deteriorate the SEI film on the electrode surface and induces deterioration of the electrode, which may seriously impair battery operation have.

$LiPF_6 \rightarrow Li^+ + PF_6^-$ (regular reaction)

$LiPF_6 \rightarrow LiF + PF_5$ (side reaction)

$PF_5 + H_2O \rightarrow 2HF + POF_3$     <Reaction formula (1)>

As such, HF may breakdown CEI of positive electrode and SEI of negative electrode, elution of positive electrode transition metal.

Preferably, the electrolyte according to exemplary embodiments of the present invention may include an additive component, or additive, that may prevent reactions between the electrolyte and the electrode due to repeated charging and discharging, including the above Reaction formula (1).

Solvent

The solvent used in the present invention is not particularly limited as long as it is a conventional solvent. Preferably, the solvent includes one or more selected from the group consisting of carbonate-based, ester-based, ether-based, ketone-based, aprotic solvent and combinations thereof.

Preferably, the carbonate-based solvent may suitably include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

Preferably, the ester-based solvent may suitably include methyl acetate (MA), ethyl acetate (EA), n-propyl acetate (n-PA), 1,1-dimethylethyl acetate (DMEA), methyl propionate (MP), ethyl propionate (EP), γ-butyrolactone (GBL), decanolide, valerolactone, mevalonolactone, caprolactone, and the like.

Preferably, the ether-based solvent may include dibutyl ether, tetraethylene glycol dimethyl ether (TEGDME), diethylene glycol dimethyl ether (DEGDME), dimethoxyethane, 2-methyltetrahydrofuran, tetrahydrofuran, and the like.

Preferably, the ketone-based solvent may suitably include cyclohexanone, and the like.

Preferably, the aprotic solvent may suitably nitriles such as R—CN (wherein R is a straight, branched or cyclic hydrocarbon group having 2 to 20 carbon atoms, which may contain a double bond aromatic ring or an ether bond) or the like, amides such as dimethylformamide (DMF) or the like, dioxolanes such as 1,3-dioxolane or the like, and sulfolanes or the like.

The above-mentioned solvents may be used alone or in combination, and when mixed and used, the mixing ratio may be suitably adjusted according to the performance of the desired cell. Although the solvent of the present invention has been exemplified above, the present invention is not limited thereto and can be appropriately designed and changed by those skilled in the art.

In certain embodiments, the solvent component ma include a carbonate-based solvent which may be selected from ethylene carbonate (EC), ethyl methyl carbonate (EMC), dimethyl carbonate (DMC), diethyl carbonate (DEC), and combinations thereof.

Additive

In the present invention, the additive may be included in the electrolyte for preventing the acidic substance (for example, HF or the like), which may be produced as a result of the decomposition of the electrolyte, from dissolving each electrode coating or damaging the active material of the positive electrode.

The additive may include one or more of the following compounds.

In the above compound, $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms.

Hereinafter, the process of scavenging the acidic substance of each additive represented by the above compound will be described with reference to Reaction formulas (2) to (4). In the Reaction formulas (2) to (4), the acidic substance is represented by HF, but it can be interpreted that various acidic substances resulting from the decomposition of the electrolyte due to charging and discharging are removed by the above reaction formula as well as HF.

<Reaction formula (2)>

<Chemical formula (2)>

In the above Reaction formula (2), HF may be removed by the additive represented by the above Chemical formula (1). For instance, the additive having Chemical formula (1) may include an aminosilane group (N—Si), and N in N—Si has a non-covalent electron pair, which is advantageous for protonation. Accordingly, the additive of Chemical formula (1) can remove HF by Reaction formula (2), and as a result of the reaction, trimethylsilyl fluoride (TMSF) may be formed.

<Reaction formula (3)>

<Chemical formula (2)>

In the above Reaction formula (3), HF may be removed by the additive represented by the above Chemical formula (2). The additive of Chemical formula (2) may include a silyl ether group (O—Si), where O in O—Si has a non-covalent electron pair, which is advantageous for protonation. Accordingly, the additive of Chemical formula (2) can remove HF by Reaction formula (3) and form trimethylsilyl fluoride as a result of the reaction.

<Reaction formula (4)>

<Chemical formula (3)>

In the above Reaction formula (4), HF is removed by the additive represented by the above Chemical formula (3). The additive of Chemical formula (3) contains a trimethylsilyl group, and the bond energy (about 318 kJ/mol) of C—Si is relatively small in Chemical formula (3). Accordingly, the additive of Chemical formula (3) can remove HF by the reaction of the above Reaction formula (4) and form trimethylsilyl fluoride as a result of the reaction.

Preferably, the additive of Chemical formula (1) may be used in the effect of scavenging HF from the additives of the above Chemical formulas (1) to (3). In the aminosilane group (N—Si) contained in the additive of Chemical formula (1), N may have a non-covalent electron pair, so that the protonation is advantageous. Further, the bonding energy of the aminosilane group (N—Si) (N—Si: 355 kJ/mol, O—Si: 452 kJ/mol) may be less than the bonding energy of the silyl ether group (O—Si) of Chemical formula (3). The additive of Chemical formula (1) may be most advantageous in scavenging HF from the additives of Chemical formulas (1) to (3) because the protonation is advantageous as described above and the binding energy is relatively small.

Further, the additive of the present invention may have a greater oxidation or reduction decomposition tendency than the carbonate-based solvent, so that the additive component compound can form CEI of the positive electrode or SEI of the negative electrode, thereby stabilizing the electrode interface and electrolyte bulk.

A shown in Tables 1 and 2 below, LUMO energies of the additives of Chemical formulas (1) to (3) are −0.509 eV, −3.398 eV, and −0.531 eV, respectively, and LUMO energies of carbonate solvents EMC, DMC and DEC are −0.3310 eV, 0.0435 eV, 0.0479 eV and 0.0454 eV, respectively. Accordingly, the additive of Chemical formulas (1) to (3) may have greater reduction decomposition tendency than the carbonate-based solvent, so that when the battery is driven, the additives of Chemical formulas (1) to (3) can be reduced and decomposed earlier than the carbonate-based solvent to form SEI on the surface of the negative electrode.

The HOMO energy of the additive of Chemical formula (1) is −7.036 eV, and the HOMO energies of the carbonate solvents EC, EMC, DMC, and DEC are −8.628 eV, −8.1223 eV, −8.2108 eV, and −8.0391 eV, respectively. Accordingly, the additive of Chemical formula (1) may have greater oxidation decomposition tendency than the carbonate-based solvent, so that when the battery is driven, the additive of Chemical formula (1) can be oxidized and decomposed earlier than the carbonate-based solvent to form CEI on the surface of the positive electrode.

Accordingly, the carbonate-based solvents (EC, EMC, DMC, DEC) may be preferably used as a solvent in combination with the additives of the present invention to stabilize the electrode interface and the electrolyte bulk.

Further, in order to stabilize the electrode interface and the electrolyte bulk, the electrolyte may suitably include the additive of Chemical formula (1) capable of forming the positive electrode CEI and the negative electrode SEI.

TABLE 1

| Solvent component | LUMO energy(eV) | HOMO energy(eV) |
|---|---|---|
| EC | −0.3310 | −8.628 |
| EMC | 0.0435 | −8.1223 |
| DMC | 0.0479 | −8.2108 |
| DEC | 0.0454 | −8.0391 |

TABLE 2

| Additive component | LUMO energy (eV) | HOMO energy (eV) |
|---|---|---|
| <Chemical formula (1)>  | −0.509 | −7.036 |
| <Chemical formula (2)>  | −3.398 | −9.175 |
| <Chemical formula(3)>  | −0.531 | −9.139 |

As described above, the additive of Chemical formula (1) may sufficiently remove HF because the protonation is advantageous and the bonding energy is relatively small. In addition, the additive of Chemical formula (1) may have greater oxidation and reduction decomposing tendency than carbonate-based solvents, so that when the battery is driven, it can stabilize the electrode interface and the electrolyte bulk by forming the positive electrode CEI and the negative electrode SEI. Preferably, the additive of the present invention may be the compound of Chemical formula (1).

Preferably, the additive may be suitably included in the electrolyte in an amount of about 0.2 to 3.0 wt % based on the total weight of the electrolyte. When the content of the additive is less than about 0.2 wt %, the acidic substance (for example, HF or the like) may not be sufficiently removed, and when the content is greater than about 3.0 wt %, the ionic conductivity may be decreased. Accordingly, the electrolyte may include the additive in an amount of about 0.2 to 3.0 wt % based on the total weight of the electrolyte.

Electrolyte

An electrolyte may include a lithium salt, a solvent and an additive including at least one of the following compounds.

The additive may include one or more of the following compounds,

The additive may be one or more of the following compounds,

In the above compounds, $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms.

Preferably, the electrolyte may further include an amount of about 0.5 to 3.0 wt % of at least one of vinylene carbonate (VC) and fluoroethylene carbonate (FEC) as a negative electrode functional additive, based on the total weight of the electrolyte. The vinylene carbonate (VC) and fluoroethylene carbonate (FEC) have lower LUMO energy than ethylene carbonate (EC), which is mainly used as a co-solvent ((EC: −0.3310 eV, VC: −0.8819 eV, FEC: −0.8444 eV, DFT calculation). The vinylene carbonate (VC) and fluoroethylene carbonate (FEC) have greater reduction decomposition tendency than the ethylene carbonate (EC), so that when the lithium secondary battery is driven, the vinylene carbonate (VC) and fluoroethylene carbonate (FEC) can be reduced and decomposed earlier than the ethylene carbonate (EC) to form SEI on the surface of the negative electrode.

For instance, when the content of the negative electrode functional additive is less than about 0.5 wt %, the SEI film may not be formed sufficiently on the surface of the negative electrode. When the content of the negative functional additive is greater than about 3.0 wt %, the ionic conductivity may be reduced which is not preferable.

The electrolyte may include an additive, which may scavenge an acidic substance such as HF or the like generated as a result of decomposition of the electrolyte. The additive may prevent an acidic substance from dissolving each electrode film or damaging the active material of the positive electrode. As consequence, the lifetime characteristics of the battery may be increased and a low resistance value may be maintained even though the additive is added.

For instance, when a carbonate-based solvent (EC, EMC, DMC, DEC) is used as a solvent for the electrolyte, the additive component compound may have a greater oxidation and reduction decomposition tendency than the solvent, which can stabilize the electrode interface and electrolyte bulk.

A lithium secondary battery may include an electrode including a positive electrode and a negative electrode, a separator between the electrodes, and an electrolyte including a lithium salt, a solvent and an additive including at least one selected from the group consisting of the following compounds.

In the above compound, $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms.

The description of the electrolyte containing the lithium salt, the solvent, and the additive is the same as described above and will be omitted. Further, the electrodes including the positive electrode and the negative electrode, and the separator between the electrodes are not particularly limited, and it is sufficient that the electrolyte according to the present invention is included, and it is a constitution that can be appropriately designed and changed by a person skilled in the art.

Hereinafter, the present invention will be described more specifically by way of examples. It should be noted, however, that the following examples are intended to illustrate the invention in more detail and not to limit the scope of the invention. The scope of the present invention is determined by the matters set forth in the claims and the matters reasonably inferred therefrom.

Example

Hereinafter, the manufacturing process of each of the comparative examples and examples will be briefly described, and then the performance of the lithium secondary battery including the electrolyte of the comparative examples and examples will be evaluated.

Preparation of Comparative Example 1

A mixed solvent was prepared in a volume ratio of 5:6:9 using ethylene carbonate (EC), diethyl carbonate (DEC), and ethyl methyl carbonate (EMC) as solvents of the electrolyte, and 1M $LiPF_6$ was dissolved to prepare an electrolyte. Coin cells were prepared with $LiNi_{0.8}Co_{0.1}Mn_{0.1}O_2$ as the positive electrode and graphite-SiC—Si alloy as the negative electrode together with the electrolyte prepared above.

Preparation of Comparative Example 2

Comparative Example 2 was prepared under the same conditions as in Comparative Example 1, except that 1 wt % of vinylene carbonate (VC) based on the total weight of the electrolyte was further added in the electrolyte.

Preparation of Example 1

Example 1 was prepared under the same conditions as in Comparative Example 1, except that the electrolyte further contained an additive of the following Chemical formula (1).

<Chemical formula (1)>

Preparation of Example 2

Example 2 was prepared under the same conditions as in Comparative Example 1, except that the electrolyte further contained an additive of the following Chemical formula (2).

<Chemical formula (2)>

Preparation of Example 3

Example 3 was prepared under the same conditions as in Comparative Example 1, except that the electrolyte further contained an additive of the following Chemical formula (3).

<Chemical formula (3)>

Preparation of Example 4-6

Example 4 was prepared under the same conditions as in Comparative Example 2, except that the electrolyte further contained 0.5 wt % of the additive of Chemical formula (1) based on the total weight of the electrolyte.

Example 5 was prepared under the same conditions as in Comparative Example 2, except that the electrolyte further contained 0.5 wt % of the additive of Chemical formula (2) based on the total weight of the electrolyte.

Example 6 was prepared under the same conditions as in Comparative Example 3, except that the electrolyte further contained 0.5 wt % of the additive of Chemical formula (3) based on the total weight of the electrolyte.

Preparation of Example 7-9

Examples 7-9 were prepared under the same conditions as in Comparative Example 1, except that the electrolyte further contained 0.5 wt %, 1 wt %, and 3 wt % of the additive of Chemical formula (1), respectively, based on the total weight of the electrolyte.

Hereinafter, the performance of the lithium secondary battery of each of the examples and comparative examples will be evaluated.

(1) Evaluation of HF Scavenging Effect

Figure 1A:
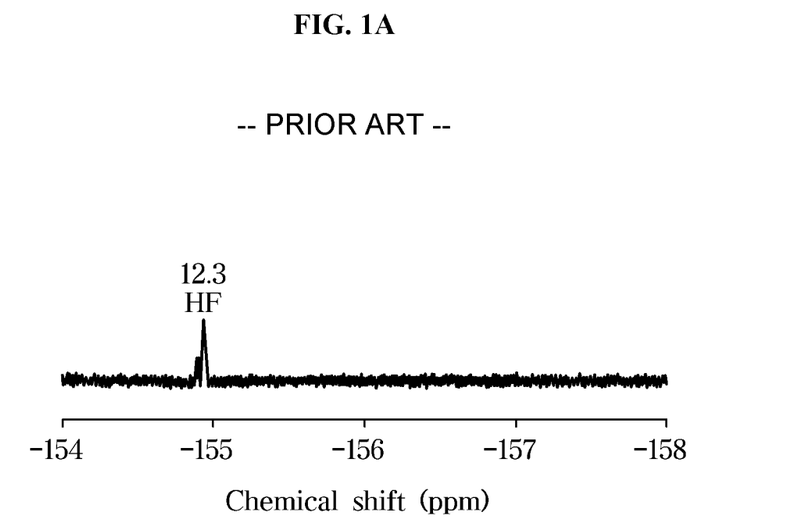
FIG. 1A is a graph of a $^{19}F$ NMR measurement result of Comparative Example 1.
Figure 1B:
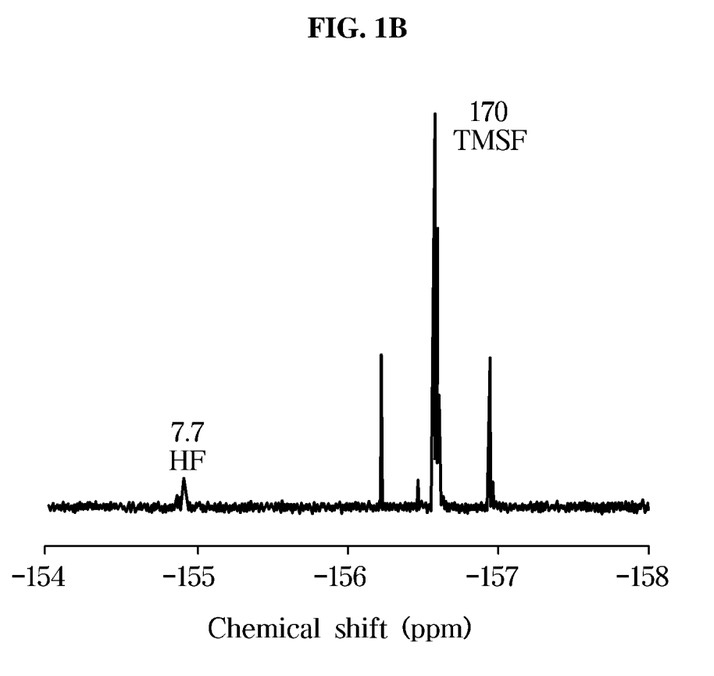
FIGS. 1B to 1D are graphs of $^{19}F$ NMR measurement results of Examples 1 to 3, respectively, according to exemplary embodiments of the present invention.
Figure 1C:
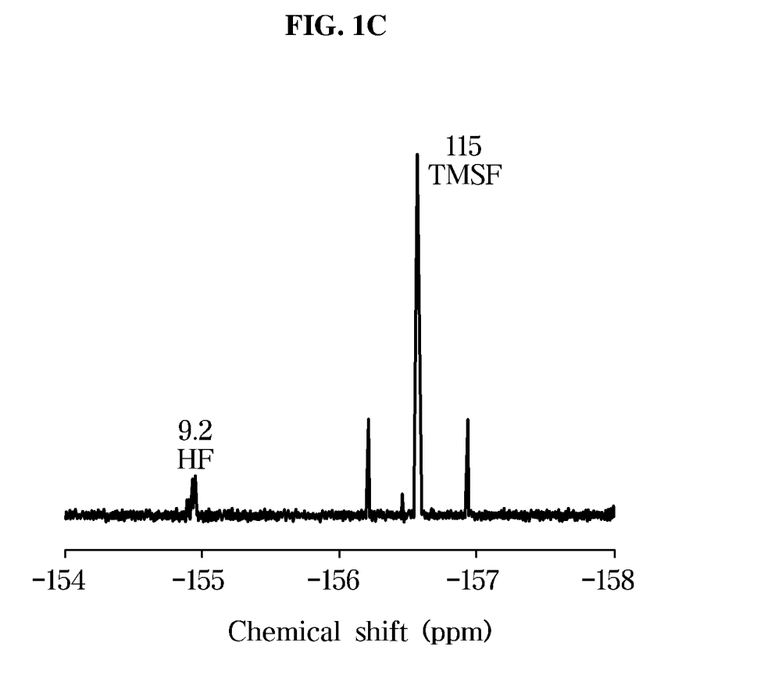
Figure 1D:
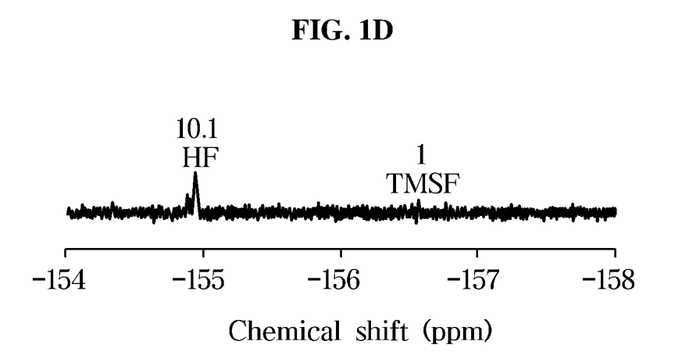

To analyze the HF scavenging effect, the HF content was measured by $^{19}F$ NMR (nuclear magnetic resonance) measurement. FIG. 1A shows the result of the $^{19}F$ NMR measurement of Comparative Example 1, and FIGS. 1B-1D correspond to $^{19}F$ NMR measurement results of Examples 1-3, respectively. Examples 1 to 3 of the present invention comprise 1 wt % of the additives of Chemical formulas (1) to (3), and after mixing for 1 hour, $^{19}F$ NMR was measured.

In FIGS. 1A to 1D, the HF described is a $^{19}F$ resonance peak at about −155 ppm, corresponding to the $^{19}F$ resonance of HF, and the TMSF described is a $^{19}F$ resonance peak at about −156.4 ppm, −156.7 ppm and −157 ppm, corresponding to the $^{19}F$ resonance of trimethylsilyl fluoride (TMSF). In addition, the numerical values described above on the HF and TMSF mean the relative signal intensity for quantitatively comparing HF and TMSF.

As shown in FIGS. 1A-1D, the signal intensity of the $^{19}F$ resonance peak of the HF of Examples 1 to 3 was lower than that of the $^{19}F$ resonance peak of the HF of Comparative Example 1, and the $^{19}F$ resonance peak of TMSF was formed, and it can be confirmed that the additives of Chemical formulas (1) to (3) have an effect of scavenging HF by the following Reaction formulas (2) to (4).

<Reaction formula (2)>

<Reaction formula (3)>

<Reaction formula (4)>

Also, in the case of Example 1 of Examples 1-3, the signal intensity of the $^{19}F$ resonance peak of the HF was decreased the most and the HF was scavenged the most, and the signal intensity of the $^{19}F$ resonance peak of the TMSF formed by scavenging HF respectively was the greatest. From this, it can be seen that the aminosilane group (Si—N) has a superior HF scavenging effect, and it can be seen that the additive of Chemical formula (1) of Example 1 has a greater HF scavenging effect than the additives of Chemical formulas (2) to (3).

(2) Evaluation of Ionic Conductivity

The results of measurement of ionic conductivity are shown in Table 3 below.

TABLE 3

| Sample | Ionic conductivity (mS/cm) |
|---|---|
| Comparative Example 1 | 7.34 |
| Comparative Example 2 | 7.42 |
| Example 4 | 7.6 |
| Example 5 | 7.0 |
| Example 6 | 7.11 |

As shown in Table 3, although Examples 4-6 additionally contain the additives of Chemical formulas (1) to (3), there was almost no difference compared to the ionic conductivities of Comparative Examples 1, 2 not containing the additive. The output characteristics of the battery were not degraded.

(3) Evaluation of Life Characteristics: Life Characteristics According to Additive Type The charging and discharging results of each of the Examples and Comparative Examples are shown in Table 4 and FIG. 2 below.

In Table 4, the 50th cycle retention rate (%) represents the discharge capacity after 50 cycles of charging and discharging with respect to the initial discharge capacity as a percentage, and the cell resistance represents the resistance as a percentage of the resistance of Comparative Example 1 as a percentage.

Figure 2:
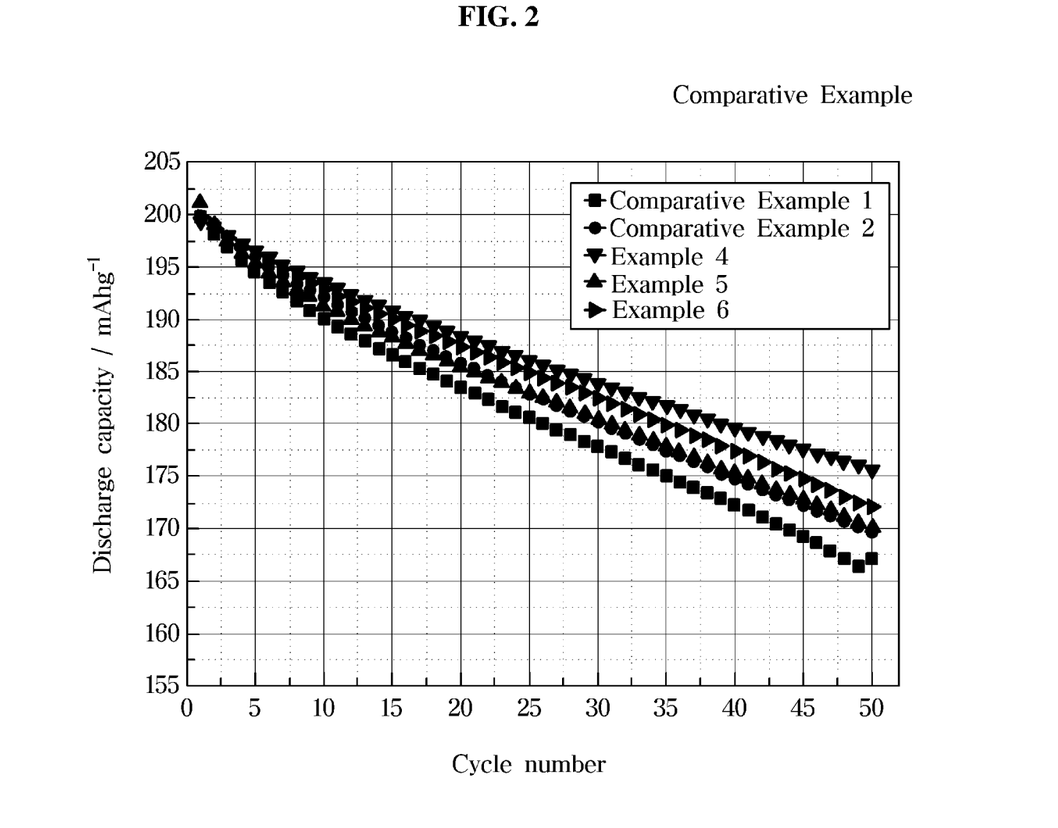
FIG. 2 is a graph showing discharge capacities according to the number of charging and discharging cycles of each of the Inventive and Comparative Examples in which the types of additives are different.

FIG. 2 is a graph showing the discharge capacity according to the number of charging/discharging cycles in each of the Examples and Comparative Examples. The lower the slope of the discharge capacity of each of the Examples and Comparative Examples shown in FIG. 2 is, the more superior the life characteristics because the change in discharge capacity is small in accordance with the number of charging/discharging cycles. In FIG. 2, the abscissa represents the cycle number, and the ordinate represents the discharge capacity (mAh/g).

TABLE 4

| Sample | Charge capacity (mAh/g) | Discharge capacity (mAh/g) | Charging/discharging efficiency (%) | $50^{th}$ Cycle retention ratio (%) | Initial cell resistance (%) | $50^{th}$ Cycle cell resistance (%) |
|---|---|---|---|---|---|---|
| Comparative Example 1 | 225 | 194 | 86.2 | 83.6 | 100 | 100 |
| Comparative Example 2 | 228 | 199 | 87.4 | 84.5 | 106.2 | 76.2 |
| Example 4 | 230 | 198 | 86.2 | 88.1 | 93.8 | 68.0 |
| Example 5 | 229 | 200 | 87.5 | 84.9 | 93.8 | 75.4 |
| Example 6 | 231 | 202 | 87.3 | 86.2 | 92.3 | 68.0 |

As shown in Table 4, Examples 4-6 show that the $50^{th}$ cycle retention ratio was superior to the Comparative Examples, and the $50^{th}$ cycle cell resistance was also lower than that of the Comparative Examples. From this, it can be seen that the life characteristics of Examples 4-6 are better than the Comparative Examples.

Particularly, Comparative Example 2 including VC solely had a better life characteristic than Comparative Example 1, and the $50^{th}$ cycle retention ratios of Examples 4-6 including VC and the additives of Chemical formulas (1) to (3) were superior to Comparative Example 2, and the $50^{th}$ cycle cell resistance was also lower than that of Comparative Example 2. Therefore, it can be seen that the additives of Chemical formulas (1) to (3) together with VC contribute to the improvement of the life characteristics.

Also, as shown in FIG. 2, the slopes of the discharge capacity according to the number of cycles of Examples 4 to 6 were less than those of the Comparative Examples, and the changes in discharge capacity according to the number of cycles were small. Accordingly, it is visually confirmed that the life characteristics of the Examples are improved from those of the Comparative Examples.

The retention rate of the $50^{th}$ cycle among Examples 4-6 was 88.1% for Example 4, which is the largest, indicating that the life characteristics of the Example 4 battery were the most excellent. Because N in the aminosilane group (N—Si) of the additive of Chemical formula (1) has a non-covalent electron pair, protonation and N—Si may have a relatively low bonding energy so that the additive of Chemical formula (1) may be most excellent in the ability to scavenge the HF among the additives of Chemical formulas (1) to (3).

From the above results, it can be seen that the electrolyte for a lithium secondary battery according to the present invention and the lithium secondary battery comprising the same have excellent life characteristics by including the additive.

(4) Life Characteristics Evaluation: Life Characteristics According to Additive Content The results of charging and discharging with different additive contents are shown in Table 5 and FIG. 3 below. In Table 5, the $50^{th}$ cycle retention ratio (%) represents the discharge capacity after 50 cycles of charging/discharging with respect to the initial discharge capacity, and is calculated from FIG. 3.

Figure 3:
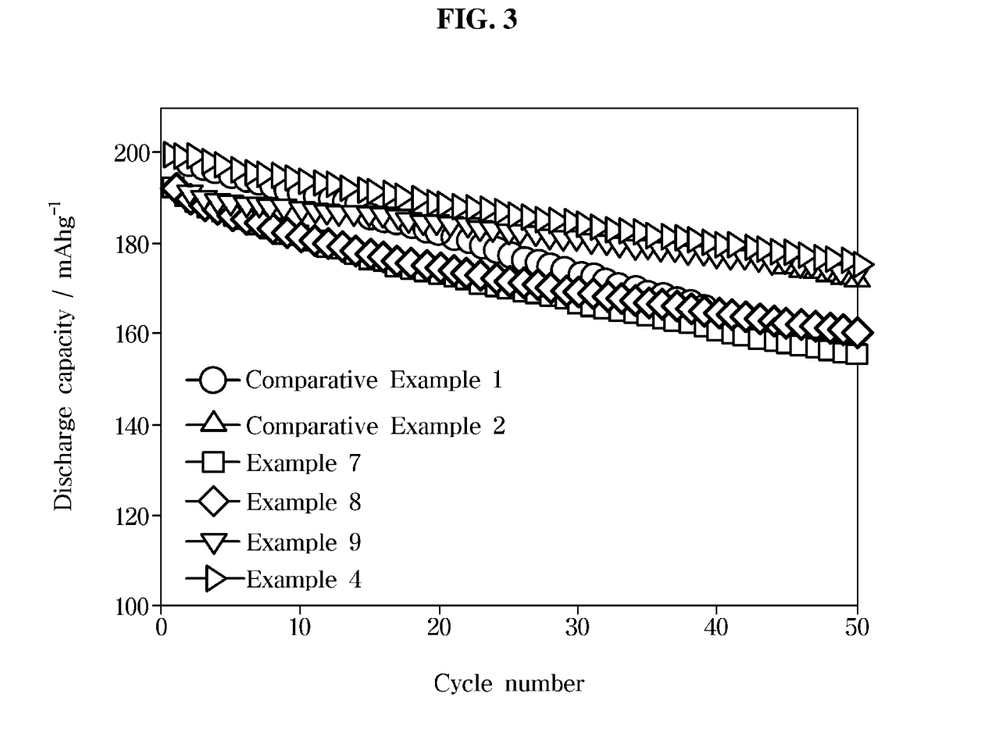
FIG. 3 is a graph showing the discharge capacities according to the number of charging and discharging cycles of each of the Examples and Comparative Examples in which the additive contents are different.

FIG. 3 is a graph showing discharge capacities according to the number of charging/discharging cycles in each of the Examples and Comparative Examples. The lower the slope of the discharge capacity of each of the Examples and Comparative Examples shown in FIG. 3 was, the more superior the life characteristics because the change in discharge capacity was small in accordance with the number of charging/discharging cycles. In FIG. 3, the abscissa represents the cycle number and the ordinate represents the discharge capacity (mAh/g).

TABLE 5

| Sample | $50^{th}$ Cycle retention ratio (%) |
|---|---|
| Comparative Example 1 | 78.1 |
| Comparative Example 2 | 86.2 |
| Example 7 | 79.7 |
| Example 8 | 83.5 |
| Example 9 | 90.2 |
| Example 4 | 88.1 |

As shown in Table 5, Examples 7-9 show that the $50^{th}$ cycle retention ratio value increased as the content of the additive of Chemical formula (1) increased. Particularly, in the case of Example 9 containing 3 wt % of the additive of Chemical formula (1) based on the total weight of the electrolyte, the retention ratio was the highest at 90.2%.

From this, it can be seen that the life characteristics are further improved as the content of the additive is increased, and it is found that when the additive is contained in an amount of 3 wt % based on the total weight of the electrolyte, the life characteristics are most excellent.

Meanwhile, comparing Comparative Example 2 and Example 4, it is found that the $50^{th}$ cycle retention ratio value of Example 4, which included both 1 wt % of VC and 0.5 wt % of the additive of Chemical formula (1) based on the total weight of the electrolyte, was higher than that of Comparative Example 2, which included 1 wt % of VC alone. Therefore, it can be seen that the inclusion of the VC and the additive of Chemical formula (1) together can further improve the life characteristics.

Accordingly, even when the additives of Chemical formulas (1) to (3) are included together with VC, which has a relatively high reduction decomposition tendency, the effect of improving the life characteristics of the battery by forming SEI films on the surface of the negative electrode is not abated. In the present invention, it can be seen preferable that the inclusion of the additives of Chemical formulas (1) to (3) together with VC can further improve the life characteristics of the battery.

As described above, the electrolyte for a lithium secondary battery according to various exemplary embodiments of the present invention may improve the life characteristics of the battery by comprising an additive, which may scavenge an acidic substance such as HF or the like produced as a result of decomposition of the electrolyte. The additive may prevent an acidic substance from dissolving each electrode film or damaging the active material of the positive electrode.

The exemplary embodiments disclosed with reference to the accompanying drawings and tables have been described above. It will be understood by those of ordinary skill in the art that various changes in form and details may be made therein without departing from the spirit and scope of the present invention as defined by the following claims. The disclosed embodiments are illustrative and should not be construed as limiting.

What is claimed is:

1. An electrolyte for a lithium secondary battery comprising:
   a lithium salt;
   a solvent component; and
   an additive comprising one or more of following compounds, and
   wherein $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms and
   wherein the electrolyte comprises the additive in an amount of about 0.2 to 3.0 wt %, based on the total weight of the electrolyte.

2. The electrolyte according to claim 1, wherein the solvent component comprises one or more selected from the group consisting of carbonate-based, ester-based, ether-based, ketone-based, aprotic solvent and combinations thereof.

3. The electrolyte according to claim 1, wherein the lithium salt comprises one or more selected from the group consisting of $LiPF_6$, $LiBF_4$, $LiClO_4$, $LiSbF_6$, $LiAsF_6$, $LiN(SO_2C_2F_5)_2$, $LiN(SO_3C_2F_5)_2$, $LiN(SO_2F_2)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (where x and y are natural numbers), $LiCl$, $LiI$, $LiB(C_2O_4)_2$ and combinations thereof.

4. The electrolyte according to claim 1, wherein the electrolyte further comprises an amount of about 0.5 to 3.0 wt % of at least one of vinylene carbonate (VC) and fluoroethylene carbonate (FEC), based on the total weight of the electrolyte.

5. A lithium battery comprising:
   a positive electrode;
   a negative electrode;
   a separator between the positive electrode and the negative electrode; and
   an electrolyte containing a lithium salt, a solvent component and an additive comprising one or more selected from the group consisting of the following compounds wherein $R_1$, $R_2$ and $R_3$ are each independently hydrogen, an alkyl group having 1 to 20 carbon atoms, a cycloalkyl group having 3 to 20 carbon atoms, an aryl group having 6 to 30 carbon atoms, or an arylalkyl group having 6 to 30 carbon atoms, and
   wherein the electrolyte comprises the additive in an amount of about 0.2 to 3.0 wt %, based on the total weight of the electrolyte.

6. The lithium battery according to claim 5, wherein the solvent component comprises one or more selected from the group consisting of carbonate-based, ester-based, ether-based, ketone-based, aprotic solvent and combinations thereof.

7. The lithium battery according to claim 5, wherein the lithium salt comprises one or more selected from the group consisting of $LiPF_6$, $LiBF_4$, $LiClO_4$, $LiSbF_6$, $LiAsF_6$, $LiN(SO_2C_2F_5)_2$, $LiN(SO_3C_2F_5)_2$, $LiN(SO_2F_2)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (where x and y are natural numbers), $LiCl$, $LiI$, $LiB(C_2O_4)_2$ and combinations thereof.

8. The lithium battery according to claim 5, wherein the electrolyte further comprises an amount of about 0.5 to 3.0 wt % of at least one of vinylene carbonate (VC) and fluoroethylene carbonate (FEC), based on the total weight of the electrolyte.

9. A vehicle comprising a lithium battery according to claim 5.

* * * * *